United States Patent [19]

Parker

[11] Patent Number: 4,643,221

[45] Date of Patent: Feb. 17, 1987

[54] VACUUM CHECK VALVE

[75] Inventor: Donald L. Parker, Middletown, Ohio

[73] Assignee: General Motors Corporation, Detroit, Mich.

[21] Appl. No.: 771,295

[22] Filed: Aug. 30, 1985

[51] Int. Cl.[4] .......................................... F16K 15/06
[52] U.S. Cl. ............................ 137/516.29; 137/526; 137/533.25
[58] Field of Search ............... 137/516.29, 526, 533.25

[56] References Cited

U.S. PATENT DOCUMENTS

| 2,736,338 | 2/1956 | Britton | 137/516.29 |
| 2,973,008 | 2/1961 | Klose | 137/516.29 |
| 4,215,717 | 8/1980 | Trosch | 137/516.29 X |
| 4,368,755 | 1/1983 | King | 137/516.29 X |

FOREIGN PATENT DOCUMENTS 218565  5/1957  Australia ....................... 137/533.25

Primary Examiner—Robert G. Nilson
Attorney, Agent, or Firm—D. D. McGraw

[57] ABSTRACT

A vacuum check valve member has a lip arrangement, which provides one sealing portion, and an inner reinforced second sealing portion, the valve member, and particularly the valve lip, acting to tend to pull itself closed with minimal flow across valve member in the valve closing direction. The inner sealing portion bottoms out at high differential pressures and is reinforced by a rigid valve body so that the valve member does not rely on the lip alone for full closure. The lip is flexible throughout the normal operating temperature range likely to be encountered, and upon opening when any ice crystals are formed thereon will flex and break up such ice crystals as the valve member is opening, preventing the valve member from sticking under extremely cold weather conditions. The valve operates without having a valve spring continually urging the valve member toward engagement with the valve seat.

1 Claim, 2 Drawing Figures

VACUUM CHECK VALVE

The invention relates to a vacuum check valve and more particularly to such a valve used in the vacuum supply line as a control for a vacuum suspended brake booster supply. This is a modification of the vacuum check valve disclosed and claimed in U.S. patent application Serial No. 771,219 filed on even date herewith by Donald Lee Heffner and Donald Lee Parker as co-inventors and assigned to the common assignee.

Vacuum check valves of the type disclosed in U.S. Pat. No. 3,086,544, entitled "Check Valve" and issued Apr. 23, 1963, have been used with vacuum suspended power brake boosters for many years. The typical valve construction has a valve element positioned in a valve chamber and made essentially of a washer and a rubber element. The valve is contained and guided within the chamber by the chamber side wall in relation to the outer periphery of the washer. A spring in the valve chamber urges the valve element toward engagement with an annular ridge which forms a valve seat around the point of entry of the inlet conduit into the valve chamber. Since air flow must pass around the valve when it is open, the guiding function of the chamber side wall permits some valve lateral movements so that the valve may not always be completely axially aligned with the valve seat. This loss presented no problem with small leaks that occasionally occur when used with larger engines. It has been found, as vehicle engines have been made smaller to achieve a higher fuel economy, less vacuum is available to operate various vehicle accessories than was the case with most vehicle engines when such check valves began to be used. Any potential problem of valve seating, as well as slow air flow, is to be considered.

The valve assembly embodying the invention herein disclosed and claimed provides for improved air flow so that it is substantially less restrictive to the flow of air from the booster to the vacuum source, which is usually the engine intake manifold, thereby providing a higher level of vacuum within the booster housing than is the case with a more restrictive vacuum check valve.

The improved vacuum check valve of the U.S. patent application referred to above is a guided poppet valve having a valve stem extending through valve housing guide means. The poppet valve is reinforced for improved sealability. The valve member seal which is engageable with the valve seat is made of a material which substantially eliminates cold weather sticking. It minimizes the formation of ice crystals between the valve seal and the valve seat so that leakage of air past the valve does not normally occur, even in extremely cold weather. The material is also of a type that has improved fuel resistance. By guiding the valve poppet with a valve stem located along the valve poppet axis, greater clearance is able to be maintained between outer periphery of the valve poppet and the adjacent inner wall of the valve housing, permitting much higher air flow rates which are subject to substantially less restriction to flow. At the same time, the valve is maintained in proper guided relation to the valve seat. The valve is continually urged toward the closed position by a valve spring.

The valve of the invention herein disclosed and claimed is a modification of the claimed invention of the above noted U.S. patent application Serial No. 771,219. It differs therefrom in that it requires no valve spring to keep a valve closing force on the valve outer lip. It also uses a very flexible lip seal that tends to close itself with minimal flow across the valve in the closing direction, and has a secondary sealing and valve load-supporting portion which becomes active after the lip has closed and is deformed. The umbrella-like lip also contributes to the valve's ability to open when moisture has formed ice crystals at the valve lip during extremely cold weather. When a pressure differential acting across the valve in the valve opening direction is exerted, the valve secondary seal moves first, and the flexible lip is moved axially and also flexes radially, opening up the lip and breaking up any ice crystals formed thereon. Experience with this valve under extremely cold conditions (minus 20° F. to minus 40° F.) has shown that the valve will not freeze closed.

IN THE DRAWINGS

Figures 1, 2:
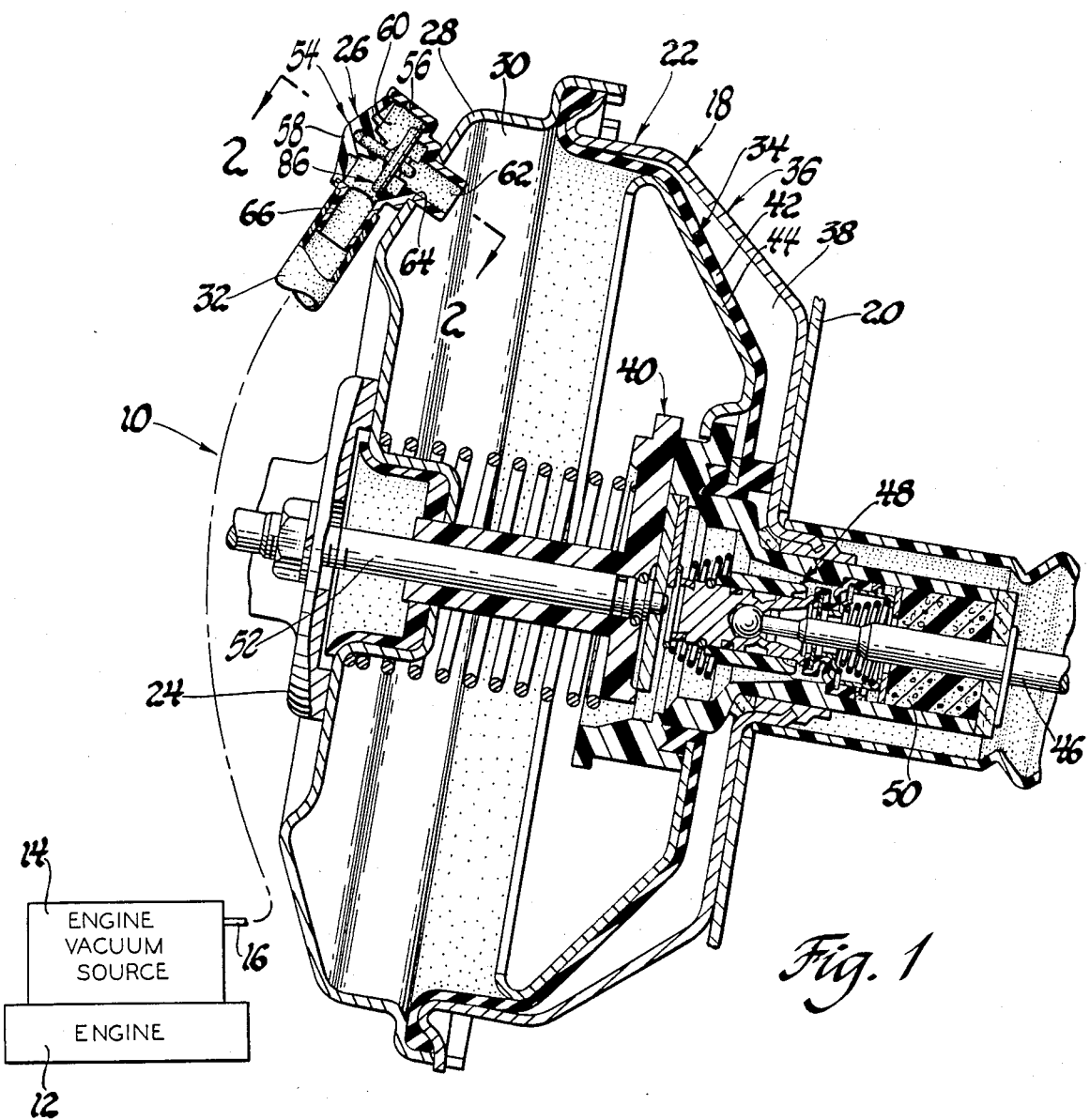
FIG. 1 is a cross-section view with parts broken away and illustrating a system embodying the vacuum check valve of the invention. The system includes a vacuum suspended brake booster and an internal combustion engine, the fuel and air intake of which acts as the vacuum source for the booster.
FIG. 2 is a fragmentary cross-section view, with parts broken away, illustrating the vacuum check valve of FIG. 1 taken in the direction of arrows 2—2 of that figure.

The system 10 shown in FIG. 1 includes an engine 12 of the internal combustion type commonly used to power motor vehicles. The engine is schematically illustrated as having a fuel and air intake 14, including an engine intake manifold. As is well known, the engine intake manifold is commonly used as a source of vacuum to supply vacuum to certain accessories. A suitable connection 16 is provided to tap into the intake manifold and obtain vacuum therefrom.

A vacuum suspended brake booster and master cylinder assembly 18 is suitably mounted to a portion 20 of a vehicle in which the system is installed so that the assembly 18 may be actuated by the vehicle operator in the usual manner. Assembly 18 includes a servomotor 22 and a master cylinder 24. The servomotor has a vacuum check valve assembly 26 mounted on the servomotor housing front section 28 and opening at one side into the servomotor vacuum chamber 30. The other side of the vacuum check valve assembly 26 is connected by a vacuum conduit 32 to the intake manifold connection 16. This provides a vacuum source for the brake booster servomotor 22.

The servomotor has a power wall 34 dividing the servomotor housing 36, of which housing front section 28 is a part, into the vacuum chamber 30 and a variable pressure chamber 38. Power wall 34 includes a piston 40, a flexible diaphragm 42, and a diaphragm support member 44. The outer periphery of diaphragm 42 is sealingly secured to housing 36 while the piston 40, diaphragm support member 44 and the inner periphery of the diaphragm 42 are linearly moveable.

The servomotor 22 includes an input push rod 46 which is moved by the vehicle operator to control the brake system. Push rod 46 is connected to control valve assembly 48 to control the pressure changes in variable pressure chamber 38. An atmospheric air pressure inlet is provided through the atmospheric air filter 50. The servomotor has an output push rod 52 which is moved by the power wall 34 upon servomotor actuation to actuate the master cylinder assembly 24 and pressurize the brake circuitry of the vehicle.

The servomotor assembly 22 is typical of vacuum suspended servomotors in common usage in this application. An example of the servomotor, with a more detailed description of its operation, is found in U.S. Pat. No. 3,249,021, issued May 3, 1966 and entitled "Power Brake Booster".

The vacuum check valve assembly 26 of FIG. 1 is illustrated in greater detail in FIG. 2. The assembly includes a housing 54 formed of housing sections 56 and 58. Housing section 58 is sealingly secured to housing section 56 somewhat like a cover and cooperates with housing section 56 to define a valve chamber 60. An inlet 62 is integrally formed with housing section 56. The inlet is constructed to secure the valve assembly to the housing front section 28 through a booster housing front section opening 64 in sealing relation. An outlet 66 is also formed as a part of housing section 56 and is arranged to receive vacuum hose 32 in sealing relation to provide communication between the valve outlet 66 and the engine intake manifold 14. The passages defined by inlet 62 and outlet 66 each connect with the valve chamber 60. Housing section 56 also has a web 68 formed therein over the passage formed by inlet 62, the web being provided with web openings 70 which provide a substantially unrestricted fluid flow connection from the inlet 62 into the valve chamber 60. Web 68 has a center part 72 which is in axial alignment with the inlet 62. An opening 74 is formed axially through the web center part 72 so that the web center part forms a guide for the valve member to be described. An annular valve seat 76 is defined by a surface formed as a part of housing section 56 and generally defining a wall of the valve chamber 60 together with web 68. As can be seen in FIG. 2, the surface of web center part 72 facing toward the main portion of the valve chamber 60 may be a planar extension of the surface defining the annular valve seat 76.

Valve housing section 58 is provided with a boss 78 extending into the valve chamber 60. Boss 78 has a recess opening 80 formed therein and opening into the valve chamber 60. Opening 80 is in axially spaced alignment with the web opening 74. The end 84 of boss 78 terminates in spaced relation to the web center part 72. Recessed opening 80 also acts as a guide for a portion of the valve member to be described.

The check valve member 86 is a poppet type of check valve and is contained within the valve chamber 60. Valve member 86 has a rigid valve member body 88 formed to include a disc-like center section 90 and a valve stem arrangement defined by a first valve stem portion 92 extending axially from one side of the center section 90 and forming a first guided valve portion which is reciprocably received and guided by recessed opening 80 of housing section 58. The stem arrangement includes a second valve stem portion 94 extending axially from the other side of the valve member center section 90 and forming a second guided valve portion. Valve stem portion 94 extends through the web opening 74 for guided reciprocal movement therein. One of the valve stem portions is larger in diameter than the other, and the same is true of the openings 74 and 80, thereby preventing the valve member 86 from being accidentally assembled in the axially reversed position from that desired. For this purpose it is preferred that the valve stem portion 94 and web opening 74 have a smaller diameter than that of the valve stem portion 92 and the recessed opening 80. Since the usual manner of assembly of the valve in the housing would be to first insert stem portion 94 through web opening 74, it is clear that the larger valve stem portion 92 could not be so inserted because web opening 74 is smaller in diameter than that valve stem portion. This effectively prevents misassembly of the valve member in the housing.

Valve member 86 has a valve member seal 96 secured to the peripheral portion of the disc-like center section 90 of the valve body 88. The annular valve member seal 96 has a secondary valve seat-engageable surface 98 and a flexible umbrella-like lip 100. In the construction illustrated, and with particular reference to the orientation of the valve as presented in FIG. 2, seat-engageable surface 98 is the annular lower side surface of the main port of the valve member seal 96. Lip 100 extends radially and axially from the outer periphery of the main part of the valve member seal 96 so as to be engageable with the annular valve seat 76 of housing section 56 radially outward of surface 98 as well as being initially engageable therewith axially before surface 98 can engage seat 76. The axial distance between the end 84 of boss 78 relative to the facing surface of the valve member body 88 is such that the valve member body may move from the closed position to fully open the valve by separating the valve member surface 98 and then lip 100 from the annular valve seat 76 a sufficient axial distance to provide substantially no flow restriction past the lip and valve seat. At the same time, stem 94 remains guided within the web opening 74 and valve stem 92 moves further into the recessed opening 80. The rigid valve member body 88 extends radially outward so that it is axially aligned with at least a part of the valve member surface 98 to provide reinforcement for the entire valve member seal 96 and stability for the valve member lip 100, thereby insuring planar sealing action of the surface 98 and lip 100 with the valve seat 76. The guiding action of openings 74 and 80 on stem portions 94 and 92, respectively, further assure the maintenance of the sealing surfaces of the valve member seal 96 in parallel planar relation with the valve seat 76 at all times.

When the valve member lip 100 is in initial sealing engagement with seat 76 as shown in FIG. 2, and thereafter so long as the valve is closed, the valve chamber 60 is separated into a chamber inlet section 104 which is in fluid communication with the inlet 62 so that the entire surface area of the valve member 86 positioned radially inward of the seat engageable surface 98 is exposed to pressure within inlet 62 and therefore the pressure in the vacuum chamber 30 of the booster 22. The chamber outlet section 106 is in full fluid communication with the outlet 66 at all times, and the pressure therein is the pressure being transmitted to the check valve assembly 26 from the engine vacuum source 14 through vacuum hose 32. This pressure also acts on the valve member 86 across the same effective surface as that described immediately above for the inlet pressure. It also acts on the annular surface area defined by the area through which surface 98 and lip 100 are in surface engagement with the annular valve seat 76. Therefore the pressure acting on valve member 86 and contained within chamber outlet section 106 acts over a slightly larger effective area than does the inlet pressure acting in the chamber inlet section 104 on the effective area of valve member 86.

When the valve assembly 26 is in the fully closed position, which is the position normally occurring when the absolute pressure in vacuum chamber 30 is less than the pressure in the vacuum conduit 32, the valve member 86 will be positioned so that its surface 98 is in engagement with valve seat 76, as well as having its lip 100 in engagement with the valve seat. Therefore if there is a relatively large pressure differential acting across the valve member 86, as when the engine 12 may not be operative, and therefore the pressure in conduit 32 and chamber section 106 is atmospheric pressure, the valve member disc-like center section 90 will carry the load of the pressure differential which is holding the valve in the closed position. If the engine 12 then becomes operative and begins to generate vacuum, the absolute pressure will decrease in conduit 32 and in the valve chamber section 106. This will decrease the pressure differential acting across the valve tending to keep the valve closed. Because the lip 100 is flexible and is made of a rubber-like material, preferably a fluro-silicone material as described in the above noted United States patent application, the lip will tend to move the valve body toward housing section 58 as it tends to recover to its normal shape and position from the somewhat stretched out and flattened position that it achieves when the surface 98 is in engagement with valve seat 76.

As the pressure differential acting across the valve member 86 shifts so that it is biased toward the outlet chamber 106, which may occur during booster actuation or when the engine vacuum source 14 generates a higher vacuum pressure level than that contained in chamber 30, the valve member 86 will tend to move further toward valve housing section 58. The pressure in chamber section 104 will then be higher than the pressure in chamber section 106, and will tend to flow out under the end of lip 100 into the chamber 106. This action will cause the lip to move so as to be clear of the valve seat 76. The pressure differential will move the valve member 86 toward cover 58 until the boss end 84 engages the valve disc-like section 90. In this position, the valve presents very little restriction to fluid flow therethrough. It can be seen that if any ice crystals have been formed on the lip 100, the flexing actions of the lip as the valve is opened will cause the ice crystals to be broken up. They will be quickly entrained in the flow of air through the valve and pass through conduit 32 to the engine intake manifold 14.

When the vacuum pressure in chamber 30 has a lesser absolute value than the vacuum pressure in chamber section 106, the air flow will begin to move around the end of lip 100 as it flows into the valve chamber section 104 and inlet 62. This will immediately pull the lip 100 back into engagement with the valve seat 76, moving the entire valve member 86 toward the valve seat 76 as necessary to accomplish this. Once the lip 100 is in engagement with valve seat 76, which is the position shown in FIG. 2, chamber 106 will again be closed from chamber 104 while the pressure differential acting across the valve member 86 is still in the direction of inlet 62. The pressure differential will continue to move the main body of the valve member 86 toward inlet 62 so that the valve seal surface 98 will also engage the valve seat 76 and will be supported axially by the disc-like center section 90 so as to carry the required load while the valve member is closed.

As the valve is being closed in response to a valve-closing fluid pressure differential bias, the valve lip 100 moves into sealing engagement with the valve seat 76 in a pilot-valve-closing action and, by eliminating the fluid pressure passage past the valve member 86, increases the valve-closing fluid pressure differential bias acting toward the valve seat to move the valve member and therefore the valve surface 98 into full sealing engagement with the valve seat 76 with a snap action.

The valve member seal 96 is preferably molded in place on the valve member body. It has been found that it is also preferable to make the valve member seal from a fluoro-silicone rubber for improved fuel vapor resistance and minimization of cold weather sticking. The material should have a durometer of about 40 to 50 at a standard temperature of 70° F., and should increase in durometer with a decrease in ambient temperature to no more than about 60 to 70 durometer at about minus 20° F. The lip may be somewhat softer, with a durometer of 20 to 40 at about 70° F., giving it greater flexibility. This will not only substantially eliminate cold weather sticking of the valve seal to the valve seat under cold weather conditions, but will also maintain good lip flexibility and valve sealing characteristics throughout the range of temperatures normally encountered in vehicles, such a temperature range being from as high as about 280° F. in the engine compartment in which the valve is normally located to as low as about minus 40° F.

By arranging the valve member so that it is guided and supported axially, greater clearance around the outer periphery of the valve member in relation to the valve housing is permitted so to minimize flow restriction in that area. It is preferred that the annular area defined by the outer periphery of the valve member 86 and the portion of the valve housing which is radially outward of the valve member outer periphery be at least as great as the effective cross-section area of the inlet port formed by inlet 62. This assures a substantially unrestricted air flow past the outer periphery of the valve member when the valve assembly is open. A considerably greater air flow may be obtained through the valve than has heretofore been the case. This therefore leads to an increase in the size of vacuum hose such as vacuum hose 32, as well as the sizes of the inlet 62 and the outlet 66, to take full advantage of the decrease in restriction to flow in the valve itself. This has resulted in substantially less pressure drop in relation to flow rate, minimizing the amount of time required to reestablish the desired vacuum pressure in the vacuum chamber of the brake booster during or after booster operation. At the same time, the average differential pressure for opening the vacuum check valve is maintained at less than one inch of mercury, with about 0.5 inch of mercury being achievable. Where the average flow restriction at a flow rate of 500 cubic feet per hour of air through the valve has previously been in the range of about 18 to 28 inches of mercury, valves embodying the invention have had an average flow restriction at this flow rate of less than 3 inches of mercury. The valve has virtually eliminated leakage when the valve is supposed to be fully closed. It has been equal or better than the best of valves in current production at moderately high temperatures. For example, at 212° F., tests have indicated that no leakage has occurred, while on some production units, as much as 20% of the valves will have some leakage at this temperature. It has substantially eliminated valve leakage and valve sticking under cold temperatures. For example, valves embodying the invention had no leaks and did not stick at minus 40° F. Valves embodying the invention have also shown dramatic improvement in leakage and potential failure with a pressure differential thereacross as small as 1.5 inch of mercury and up to 20 inches of mercury, in comparison to various valves used by different manufacturers.

The embodiments of the invention in which an exclusive property or privilege is claimed are defined as follows:

1. A vacuum check valve assembly comprising:
a housing having
 a first section and a second section, said first section having
 a valve chamber formed therein and an inlet connectable to a vacuum suspended power brake booster and an outlet in a sidewall of said housing first section opening into said valve chamber and connectable to an engine intake manifold for vacuum pressure supply to the booster, said housing second section being a cover secured to said housing first section to provide a closed end for said valve chamber, a valve seat in said valve chamber formed on a part of said housing first section and positioned in axial alignment with said housing inlet, said valve seat being a flat annular surface,
a poppet valve member in said valve chamber having
 an axially extending guide stem cooperating with axially aligned openings in said valve housing to guide and maintain said valve member first and second valve seat engageable sections in operative surface engageable alignment with said flat annular surface valve seat for full sealing engagement and disengagement therewith,
 the guide opening in said housing second section being a closed recess formed in a boss extending into said valve chamber toward said valve inlet, said boss acting as a valve open position stop, and the guide opening in said housing first section being in an open web having a surface thereof defining with said flat annular surface valve seat a coplanar wall of said valve chamber on the opposite side thereof from said housing second section,
 said valve member having a rubber-like valve seal forming said first and second valve seat engageable sections and a valve member body including a disc-like section mounted on said valve stem in planar parallel relation with said flat annular surface valve seat,
 said disc-like section receiving and supporting said valve seal,
 said valve seal having a first annular seal surface on said first valve seat engaging section axially aligned with a first annular part of said flat annular surface valve seat for surface sealing engagement therewith and also axially aligned with an annular part of said valve member body disc-like section so as to be axially reinforced thereby against planar distortion relative to said flat annular surface valve seat to insure full sealing engagement between said valve seal first annular seal surface and said valve seat first annular part;
 said valve seal further having a flexible annular lip providing a second annular seal surface axially aligned with a second annular part of said flat annular surface valve seat for surface sealing engagement therewith, said flexible lip extending radially beyond said valve member body disc-like portion and axially toward said valve seat and when said valve seat first annular seat surface is disengaged from said flat annular surface valve seat extending axially closer to said flat annular surface valve seat than does said valve seat first annular seat surface;
 said valve seal lip being subject to a differential pressure biased toward said valve seat to be moved by such differential pressure and sealingly engage said valve seat second annular part before there is sufficient pressure differential pressure acting across all of said valve member to move all of said valve member toward said valve seat, there being sufficient pressure differential imposed on all of said valve member upon the sealing of said valve seat by said flexible lip second annular seal surface to quickly move said valve member axially toward said valve seat and establish sealing engagement of said valve seat first annular seal surface with said valve seat first annular part;
said valve member being axially movable in response to a pressure differential bias away from said valve seat and tending to unseat said valve seal from said valve seat, said axial movement of said valve member first moving said valve seal first annular seal surface away from engagement with said valve seat first annular part to permit said last named pressure differential to then act on said flexible lip and flex said lip to lift said lip second annular seal surface from said valve seat second annular part.

* * * * *